W. V. TURNER.
ELECTROPNEUMATIC BRAKE.
APPLICATION FILED JULY 27, 1915.

1,183,912.

Patented May 23, 1916.

WITNESSES

INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

1,183,912.  Specification of Letters Patent.  Patented May 23, 1916.

Application filed July 27, 1915. Serial No. 42,130.

*To all whom it may concern:*

Be it known that I, WALTER V. TURNER, a citizen of the United States, residing at Wilkinsburg, in the county of Allegheny and State of Pennsylvania, have invented new and useful Improvements in Electropneumatic Brakes, of which the following is a specification.

This invention relates to electro-pneumatic brakes, and more particularly to that type in which the brakes may be controlled either electrically or pneumatically.

One object of my invention is to provide an electro-pneumatic brake device in which an electric application may be effected by the use of a magnet and valve of small size.

Another object of the invention is to provide improved means for limiting the brake cylinder pressure in an electric service application of the brakes.

Figure 1:
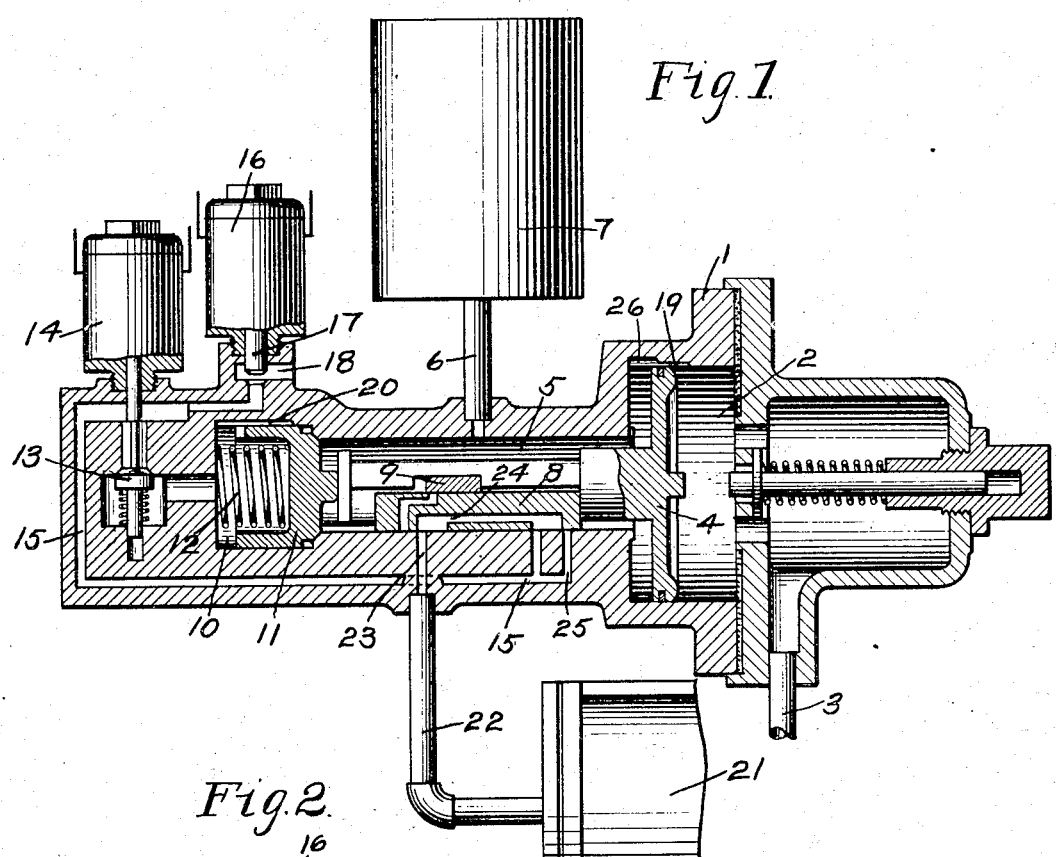

In the accompanying drawing; Figure 1 is a sectional view of an electro-pneumatic brake equipment embodying my invention, showing the parts in normal release position; and Fig. 2 a similar view, showing the parts in electric application position.

According to my invention, a triple valve device may be provided comprising a casing 1 having a piston chamber 2 connected to brake pipe 3 and containing piston 4 and having a valve chamber 5 connected by pipe 6 to auxiliary reservoir 7 and containing a main slide valve 8 and a graduating slide valve 9 adapted to be operated by the piston 4.

Adjacent to the chamber 5 is a chamber 10 containing an excess pressure valve piston 11, subject on one side to the pressure of an excess spring 12, and on the opposite side to pressure in the valve chamber 5. Chamber 10 opens to the under side of an electric application valve 13, adapted to be operated by a magnet 14 for opening communication from chamber 10 to a passage 15 which leads to the seat of slide valve 8.

For controlling the release of the brakes, a release magnet 16 and a valve 17 may be provided, the valve 17 being operated by the magnet 16 for controlling the venting of fluid from passage 15 to exhaust port 18.

In operation, the system being charged with fluid under pressure in the usual manner, fluid from the brake pipe 3 flows through the feed groove 19 around piston 4 and charges the auxiliary reservoir 7. Auxiliary reservoir pressure, acting on the face of the excess pressure valve 11, operates to unseat the valve and open a feed groove 20, so that chamber 10 will be charged. When said chamber has been charged to a predetermined pressure less than the auxiliary reservoir pressure, as determined by the spring 12, the valve 11 will be returned to its seat, as shown in Fig. 1 of the drawing.

In release, the electric application valve 13 is closed and the electric release valve 17 is open, so that brake cylinder 21 is open to the exhaust port 18 through pipe 22, passage 23, cavity 24 in slide valve 8, and passage 15.

When an electric service application of the brakes is made, the application valve 13 is opened and the release valve 17 closed. Fluid in chamber 10 is then vented to the brake cylinder through passage 15, cavity 24, passage 23, and pipe 22. The auxiliary reservoir pressure in valve chamber 5 thereupon moves the excess pressure valve 11 from its seat, opening groove 20, so that fluid from the auxiliary reservoir is vented to the brake cylinder past the electric application valve 13. The reduction in auxiliary reservoir pressure thus produced causes the movement of the triple valve piston 4 by the higher brake pipe pressure to the inner position shown in Fig. 2 of the drawing. In this position a branch port 25 leading to passage 15 is uncovered, so that a direct flow from the auxiliary reservoir to the brake cylinder is provided.

It will now be seen that the valve 13 and magnet 14 may be of small size, since they are only required to have capacity enough to effect the venting of fluid from chamber 10, and while fluid flows to some extent from the auxiliary reservoir to the brake cylinder past the application valve 13, the main flow is effected by the movement of the triple valve parts to open the port 25.

If a continuous application of the brakes is effected, fluid will flow to the brake cylinder until the brake cylinder pressure has been increased to the predetermined maximum degree, less than the auxiliary reservoir pressure, for which the spring 12 may be adjusted, when said valve will be returned to its seat, and the triple valve parts to the position shown in Fig. 1. By this means the maximum pressure obtainable in the brake cylinder in an electric service application of the brakes will be limited to a degree less than that carried in the system.

In order to insure that fluid will feed from the brake pipe to the auxiliary reservoir as fast as it is supplied to the brake cylinder, an enlarged feed groove may be provided in the inner position of the triple valve piston 4.

Figure 2:
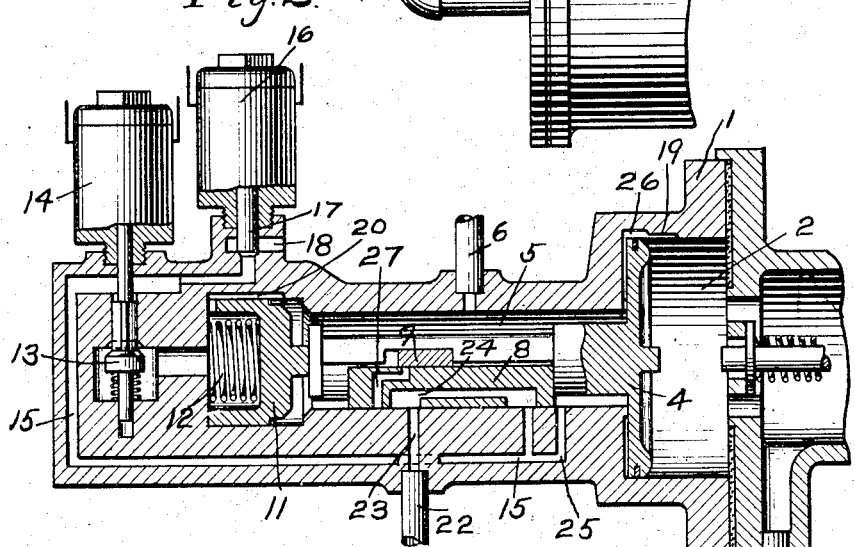

Cavity 24 is provided with elongated ports, so that communication between passages 15 and 23 will be maintained in both the normal release position and the inner position, shown in Fig. 2 of the drawing.

A pneumatic application of the brakes may be made in the usual manner by effecting a reduction in brake pipe pressure which operates to shift the triple valve parts so that service port 27 registers with passage 23 for supplying fluid from the auxiliary reservoir to the brake cylinder.

Having now described my invention, what I claim as new and desire to secure by Letters Patent, is:

1. In an electro-pneumatic brake, the combination with a brake pipe, auxiliary reservoir, and a valve device subject to the opposing pressures of the brake pipe and auxiliary reservoir and operated upon a reduction in auxiliary reservoir pressure for supplying fluid to the brake cylinder, of an electrically controlled valve for effecting a reduction in auxiliary reservoir pressure.

2. In an electro-pneumatic brake, the combination with a brake pipe, auxiliary reservoir, and a valve device subject to the opposing pressures of the brake pipe and auxiliary reservoir and operated upon a reduction in auxiliary reservoir pressure for supplying fluid to the brake cylinder, of valve means controlling the venting of fluid from the auxiliary reservoir, and an electrically controlled valve for effecting the operation of said valve means.

3. In an electro-pneumatic brake, the combination with a brake pipe, auxiliary reservoir, and a valve device subject to the opposing pressures of the brake pipe and auxiliary reservoir, and operated upon a reduction in auxiliary reservoir pressure for supplying fluid to the brake cylinder, of an electrically controlled valve for venting fluid from the auxiliary reservoir and means operating at a predetermined brake cylinder pressure for cutting off the flow of fluid from the auxiliary reservoir to the brake cylinder.

4. In an electro-pneumatic brake, the combination with a brake pipe, auxiliary reservoir, and a valve device subject to the opposing pressures of the brake pipe and auxiliary reservoir and operated upon a reduction in auxiliary reservoir pressure for supplying fluid to the brake cylinder, of an electrically controlled valve for venting fluid from the auxiliary reservoir and means operated at a predetermined degree of brake cylinder pressure for shifting said valve device to cut off the flow from the auxiliary reservoir to the brake cylinder.

5. In an electro-pneumatic brake, the combination with a brake pipe, auxiliary reservoir, and a valve device subject to the opposing pressures of the brake pipe and auxiliary reservoir, and operated upon a reduction in auxiliary reservoir pressure for supplying fluid to the brake cylinder, of an electrically controlled valve for venting fluid from the auxiliary reservoir to the brake cylinder and an excess pressure valve operated by auxiliary reservoir pressure for opening communication through which fluid is vented to the brake cylinder and adapted to close said communication upon a predetermined increase in brake cylinder pressure.

6. In an electro-pneumatic brake, the combination with a brake pipe, auxiliary reservoir, and a valve device subject to the opposing pressures of the brake pipe and auxiliary reservoir and operated upon a reduction in auxiliary reservoir pressure for supplying fluid from the auxiliary reservoir to the brake cylinder, of an electrically controlled valve for reducing the auxiliary reservoir pressure, a small feed groove for supplying fluid from the brake pipe to the auxiliary reservoir in the normal position of said valve device, and a large feed groove for supplying fluid to the auxiliary reservoir in the electric application position thereof.

In testimony whereof I have hereunto set my hand.

WALTER V. TURNER.

Witnesses:
 A. M. CLEMENTS,
 S. W. KEEFER.